(12) United States Patent
Chan et al.

(10) Patent No.: US 10,951,026 B2
(45) Date of Patent: Mar. 16, 2021

(54) POWER DISTRIBUTION APPARATUS

(71) Applicant: DELTA ELECTRONICS, INC., Taoyuan (TW)

(72) Inventors: Chih-Chiang Chan, Taoyuan (TW); I-Chieh Li, Taoyuan (TW); Wen-Hsiang Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 768 days.

(21) Appl. No.: 15/652,469

(22) Filed: Jul. 18, 2017

(65) Prior Publication Data
US 2018/0145508 A1    May 24, 2018

(30) Foreign Application Priority Data

Nov. 23, 2016    (CN) .......................... 201611036509.7

(51) Int. Cl.
*H02J 3/00*      (2006.01)
*H02H 3/16*     (2006.01)
*H02H 7/22*     (2006.01)

(52) U.S. Cl.
CPC ............... *H02J 3/00* (2013.01); *H02H 3/162* (2013.01); *H02H 7/22* (2013.01); *H02J 3/001* (2020.01)

(58) Field of Classification Search
CPC ... H02H 3/00–52; H02H 7/00–30; H02J 3/00; H02J 3/001
See application file for complete search history.

(56) References Cited

U.S. PATENT DOCUMENTS

| 10,250,032 | B2* | 4/2019 | Ferguson | .................. H02H 3/08 |
| 2010/0033140 | A1 | 2/2010 | Otake | |
| 2011/0170223 | A1* | 7/2011 | DiMarco | .................. H02H 3/08 361/94 |

(Continued)

FOREIGN PATENT DOCUMENTS

| CN | 104466736 | 3/2015 |
| EP | 1367689 | 12/2003 |

OTHER PUBLICATIONS

Office Action dated Jul. 21, 2017 from corresponding application No. TW 105138353.

(Continued)

*Primary Examiner* — Jared Fureman
*Assistant Examiner* — Christopher J Clark
(74) *Attorney, Agent, or Firm* — Hauptman Ham, LLP

(57) ABSTRACT

A power distribution apparatus includes a power source terminal, a power-distributing module, at least a power distribution module, an input detection unit, at least an output detection unit and a management unit. The power source terminal receives an input power. The power-distributing module converts the input power into an output power. Each of the power distribution modules includes a plurality of output ports. The power distribution module receives the output power to output the output power through the output ports. The input detection unit detects the input power to generate a set of input information. The output detection unit detects the output power to generate at least a set of output information correspondingly. According to the input information or the output information, the management unit controls the output ports to be turned on or off correspondingly.

7 Claims, 5 Drawing Sheets

(56) References Cited

U.S. PATENT DOCUMENTS

| | | | |
|---|---|---|---|
| 2012/0146655 A1* | 6/2012 | Suchoff | G01R 31/52 |
| | | | 324/509 |
| 2012/0266007 A1* | 10/2012 | Menon | G06F 1/26 |
| | | | 713/340 |
| 2014/0108827 A1* | 4/2014 | Mathew | H05K 7/1498 |
| | | | 713/300 |
| 2016/0327595 A1* | 11/2016 | Reinders | G06F 1/28 |

OTHER PUBLICATIONS

Office Action dated Mar. 22, 2019 from corresponding application No. CN 20161103650937.

\* cited by examiner

POWER DISTRIBUTION APPARATUS

BACKGROUND OF THE INVENTION

Field of the Invention

The present invention relates to a power distribution apparatus and an operation method for the same, and especially relates to a power distribution apparatus with the leakage current detection and an operation method for the same.

Description of the Related Art

A power distribution unit (PDU) is a power apparatus that comprises a plurality of power sockets. The power distribution unit provides power to a server and a storing system in a frame. With the development of the computer technology and the rapid development of the Internet, there are more and more services or functions provided through the Internet, so that a data center having a plurality of computers or servers is increasing quickly. In order to provide more services or functions on the Internet, the data center has to increase the computers or the servers that causes the problems of power supply, distribution and management of the data center. In order to solve the problems of power supply, distribution and management of the data center, the data center utilizes the power distribution apparatus to distribute power to each of the computers or servers.

The power distribution apparatus comprises two types: the dump power distribution apparatus and the intelligent power distribution apparatus. The dump power distribution apparatus simply distributes power to the devices. The related art intelligent power distribution apparatus not only distributes power to the devices, but also monitors and measures power through the remote network. Moreover, utilizing the remote control and management, each of the related art intelligent power distribution apparatuses determines whether the related art intelligent power distribution apparatus supplies power to the connected computer (or server) or not, so that the overall electricity efficiency of the data center is optimized.

However, the design of the related art power distribution apparatus frequently ignores the safety protection mechanism when the related art power distribution apparatus is installed and turned on, or even after the related art power distribution apparatus has worked for a certain time. When the device is installed, the ground (or earth) connection is especially important because the device or other devices may have the situation of the electrical leakage. Before the power distribution apparatus provides power with the device, power or power distribution has to be checked to ensure power or power distribution is correct to avoid the device being damaged. Moreover, after being used for a certain time, according to the power quality or the load status, the switches on the power distribution apparatus have to be turned on/off to protect the safety of the device in the backend and the overall data center.

Therefore, the inventors of the present invention would like to solve the problems mentioned above and would like to design a power distribution apparatus and an operation method for the same which determine whether the ground (or earth) connection is complete or not by utilizing the leakage current detection, and which provide a complete protection mechanism by a complete detection process, and which have customized and adjusted protection parameters to flexibly adjust the usage distribution of the device in the backend.

SUMMARY OF THE INVENTION

In order to solve the above-mentioned problems, the present invention is to provide a power distribution apparatus to overcome the problems of the prior art. Therefore, the power distribution apparatus of the present invention comprises a power source terminal, a power-distributing module, at least a power distribution module, an input detection unit, at least an output detection unit and a management unit. The power source terminal receives an input power. The power-distributing module is electrically connected to the power source terminal and converts the input power into an output power. Each of the power distribution modules includes a plurality of output ports and is electrically connected to the power-distributing module to receive the output power to output the output power to the output ports to output the output power. The input detection unit is electrically connected between the power-distributing module and the power source terminal to detect the input power to generate a set of input information. The output detection unit is electrically connected to the output ports and detects the output power to generate at least a set of output information correspondingly. According to the input information or the output information, the management unit controls the output ports to be turned on or off correspondingly.

In an embodiment, according to the input information, the management unit controls all of the output ports of the power distribution module to be turned on or off. According to the output information, the management unit controls the output ports to be turned on or off.

In an embodiment, the power distribution apparatus further comprises an electrical leakage detection unit electrically connected to the power source terminal. The electrical leakage detection unit outputs the electrical leakage information to the management unit. Moreover, the management unit controls the output ports to be turned off according to the electrical leakage information being exceeding a first range (namely, when the electrical leakage information is exceeding the first range).

In an embodiment, the power distribution module further comprises a first customizing unit electrically connected to the output detection unit. The first customizing unit generates a second range.

In an embodiment, the management unit determines whether the output information is within the second range or not. The management unit turns off the output ports which are out of (namely, which are not within) the second range correspondingly.

In an embodiment, the power distribution apparatus further comprises a second customizing unit electrically connected to the management unit. The second customizing unit generates a third range.

In an embodiment, the management unit determines whether the input information is within the third range or not. The management unit turns off all of the output ports of the power distribution module which are out of (namely, which are not within) the third range.

In an embodiment, the management unit at least determines whether the phase difference information and total harmonic distortion information of the input information are within the third range or not.

In an embodiment, the input detection unit comprises a detection unit and a calculation unit. The detection unit is electrically connected between the power-distributing module and the power source terminal to detect the input power to obtain a set of power source information. The calculation unit is electrically connected to the detection unit and converts the power source information into the input information.

In an embodiment, the power distribution apparatus further comprises a transmission unit electrically connected to the management unit. The transmission unit outward transmits the information in the management unit.

In order to solve the above-mentioned problems, the present invention is to provide an operation method for a power distribution apparatus to overcome the problems of the prior art. Therefore, the power distribution apparatus of the present invention distributes an input power to a plurality of output ports to output an output power respectively. A management unit controls the output ports to be turned on or off. The operation method comprises following steps. (a) The management unit performs a first detection process and then determines whether the output ports are turned on or off when the power distribution apparatus receives the input power. (b) The management unit outward transmits information in the management unit if the output ports are turned off after the management unit performs the first detection process. (c) The management unit performs a second detection process and then determines whether the output ports are turned on or off if all of the output ports are turned on after the management unit performs the first detection process. (d) The management unit outward transmits the information in the management unit and returns to the second detection process after the management unit performs the second detection process.

In an embodiment, the first detection process comprises following steps. (a1) The management unit controls the output ports to be turned off when the management unit determines that the electrical leakage information is exceeding a first range. (a2) The management unit controls the output ports to be turned off when the management unit determines that the input power or the output power is abnormal.

In an embodiment, the step (d) further comprises following step. (d01) The management unit turns off the output ports and outward transmits the information in the management unit if the management unit determines that the electrical leakage information is exceeding the first range when the management unit performs the second detection process.

In an embodiment, the step (b) further comprises following step. (b1) The management unit continues to detect that the output ports have to be kept off.

In an embodiment, the second detection process comprises following steps. (c1) The management unit detects a set of input information. (c2) The management unit detects at least a set of output information.

In an embodiment, the step (c1) further comprises following step. (c11) The management unit determines whether the input information is within a third range or not. The management unit turns off all of the output ports of the power distribution module which is out of (namely, which is not within) the third range.

In an embodiment, the step (c1) further comprises following step. (c12) The management unit determines whether the input information is within the third range or not. The management unit turns on all of the output ports of the power distribution module which is within the third range.

In an embodiment, the step (c2) further comprises following step. (c21) The management unit determines whether the output information is within a second range or not. The management unit turns off the output ports which are out of (namely, which are not within) the second range correspondingly.

In an embodiment, the step (c2) further comprises following step. (c22) The management unit determines whether the output information is within the second range or not. The management unit turns on the output ports which are within the second range correspondingly.

Please refer to the detailed descriptions and figures of the present invention mentioned below for further understanding the technology, method and effect disclosed by the present invention to achieve the predetermined purpose of the present invention. The purpose, features and characteristics of the present invention can be understood well and in details. However, the figures are only for references and descriptions, but the present invention is not limited by the figures.

DETAILED DESCRIPTION OF THE INVENTION

Please refer to following detailed description and figures for the technical content of the present invention.

Figure 1:
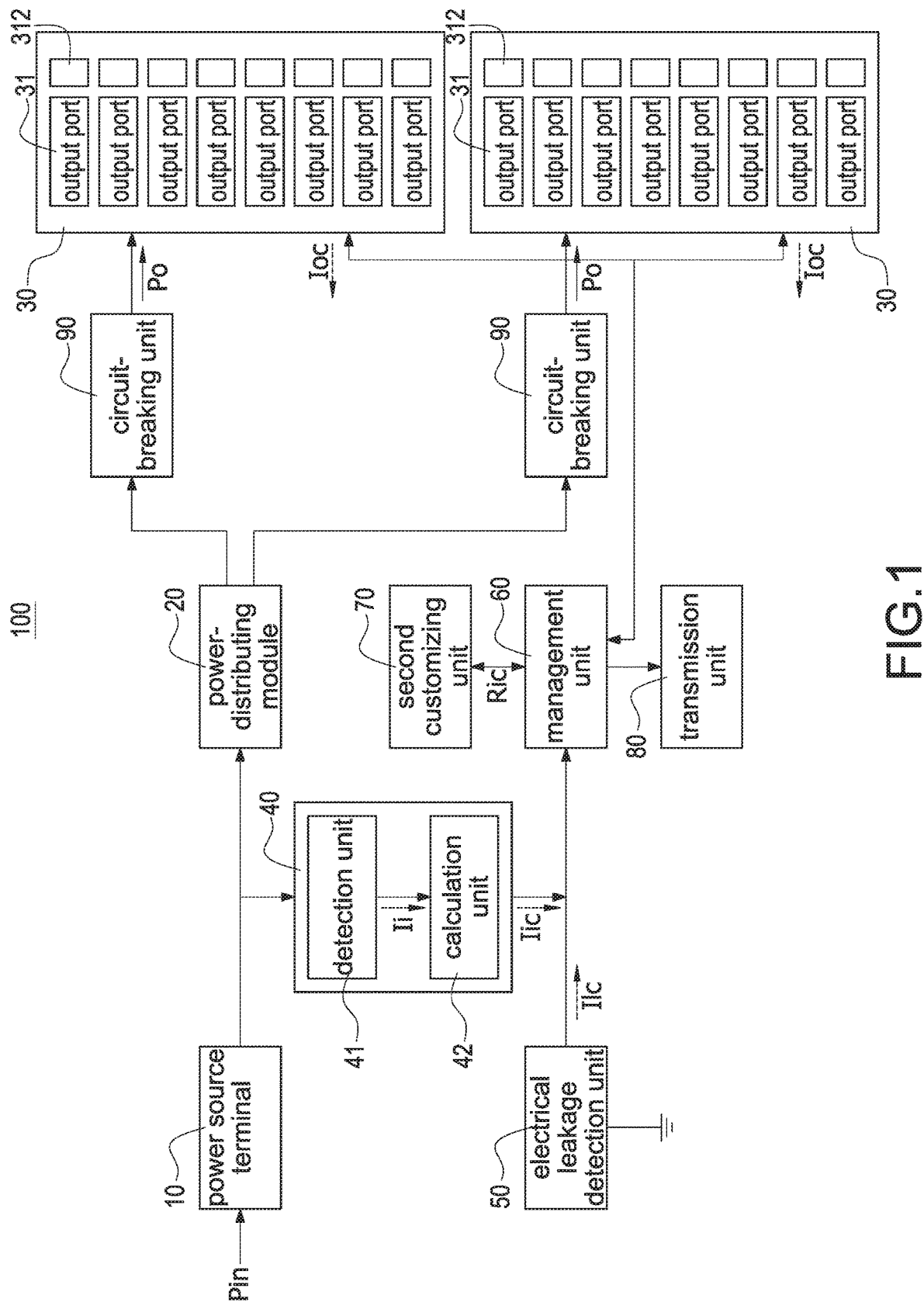
FIG. 1 shows a block diagram of the power distribution apparatus of the present invention.

FIG. 1 shows a block diagram of the power distribution apparatus of the present invention. A power distribution apparatus 100 is electrically connected to an external power source circuit (not shown in FIG. 1) and comprises a power source terminal 10, a power-distributing module 20, at least a power distribution module 30, an input detection unit 40 and a management unit 60. The power source terminal 10 is electrically connected to the power-distributing module 20. The power-distributing module 20 receives an input power Pin through the power source terminal 10. Each of the power distribution modules 30 includes a plurality of output ports 31. The power distribution modules 30 are electrically connected to the power-distributing module 20. The power-distributing module 20 distributes the input power Pin as an output power Po. The output ports 31 output the output power Po respectively. Moreover, the input power Pin comprises an input voltage and an input current. The output power Po comprises an output voltage and an output current. Taking FIG. 1 as an example, the power distribution apparatus 100 comprises two power distribution modules 30. Each of the power distribution modules 30 comprises eight output ports 31. Therefore, the power-distributing module 20 is electrically connected to the two power distribution modules 30, and distributes the input power Pin as the output power Po, and outputs the output power Po to total sixteen output ports 31 of the two power distribution modules 30. Moreover, the input power Pin can be a three-phase alternating-current input power or a single-phase alternating-current input power. Therefore, when the input power Pin is the three-phase alternating-current input power, there are three input detection unit 40 to detect different phases of the input power Pin. Moreover, the power-distributing module 20 can convert the three-phase input power Pin into the single-phase output power Po, or can distribute the single-phase input power Pin as the single-phase output power Po. Moreover, the quantities of the power distribution module 30 and the output port 31 shown in FIG. 1 are just for convenient explanation and are just an example but the present invention is not limited to it. Therefore, for example, the power-distributing module 20 can be electrically connected to a power distribution module 30 and the power distribution module 30 comprises ten output ports 31. Or the power-distributing module 20 can be electrically connected to three power distribution modules 30 and each of the power distribution modules 30 comprises an output port 31.

Please refer to FIG. 1 again. The power distribution apparatus 100 further comprises an input detection unit 40 and an electrical leakage detection unit 50. The input detection unit 40 is electrically connected between the power-distributing module 20 and the power source terminal 10 to detect the input power Pin to generate a set of input information Iic. The electrical leakage detection unit 50 is electrically connected between the power source terminal 10 and an earth point (namely, a ground point) of the power distribution apparatus 100. The electrical leakage detection unit 50 outputs the electrical leakage information Ilc to indicate the status of electrical leakage to the management unit 60. The management unit 60 receives and determines at least a set of output information Ioc (which is outputted from one of the power distribution modules 30), the electrical leakage information Ilc and the input information Iic (which is outputted from the input detection unit 40) to control the output ports 31 to output the output power Po or to not output the output power Po. The output information Ioc is outputted from each of the power distribution modules 30. Therefore, taking FIG. 1 as an example, the power distribution apparatus 100 comprises two power distribution modules 30, so that there are two sets of the output information Ioc correspondingly. In another word, a quantity of the output information Ioc is determined by a quantity of the power distribution module 30. Moreover, the input detection unit 40 is to detect the input power Pin which is sent through the power source terminal 10 and is to generate the input information Iic. Therefore, the input detection unit 40 is not limited to be arranged between the power-distributing module 20 and the power source terminal 10. For example, according to the requirement of the design, the input detection unit 40 can be arranged at the power source terminal 10 or in the power-distributing module 20. Similarly, the electrical leakage detection unit 50 can be arranged between the power source terminal 10 and the power-distributing module 20 according to the requirement of the design, or the electrical leakage detection unit 50 can be integrated into the input detection unit 40. Moreover, the input power Pin and the output power Po shown in FIG. 1 are power supply signals, so that solid arrows show directions of the input power Pin and the output power Po. The input information Iic, the electrical leakage information Ilc and the output information Ioc are detection/feedback signals, so that dotted arrows show directions of the input information Iic, the electrical leakage information Ilc and the output information Ioc.

As shown in FIG. 1, the input detection unit 40 comprises a detection unit 41 and a calculation unit 42. The detection unit 41 is electrically connected between the power-distributing module 20 and the power source terminal 10 to detect the input power Pin on a path of the power source terminal 10 and the power-distributing module 20 to output a set of power source information Ii. The calculation unit 42 is electrically connected to the detection unit 41 and converts the power source information Ii into the input information Iic. The detection unit 41 detects the input power Pin to obtain the voltage (phase voltage) information, current (phase current) information, apparent power information, effective power (namely, active power) information, virtual power (namely, reactive power) information, frequency information and phase information of the input power Pin sent through the power source terminal 10, and generates the power source information Ii, and outputs the power source information Ii to the calculation unit 42. The calculation unit 42 processes the power source information Ii received and works out (namely figures out) a set of phase difference information, power factor information and total harmonic distortion information of the input power Pin according to the power source information Ii, the calculation unit 42 outputs signals of the input information Iic to the management unit 60. Therefore, the input information Iic comprises the voltage (phase voltage) information, the current (phase current) information, the apparent power information, the effective power (namely, active power) information, the virtual power (namely, reactive power) information, the frequency information, the phase information, the phase difference information, the power factor information and the total harmonic distortion information of the input power Pin. The electrical leakage detection unit 50 detects a ground impedance of the power source terminal 10 and a leakage current to obtain the electrical leakage information Ilc, and outputs the electrical leakage information Ilc to the management unit 60.

Please refer to FIG. 1 again. The power distribution apparatus 100 further comprises a second customizing unit 70 electrically connected to the management unit 60. The second customizing unit 70 can store a third range Ric of each of the power distribution modules 30 and output the third range Ric to the management unit 60. The management unit 60 compares the third range Ric with the input information Iic to determine whether each of the power distribution modules 30 outputs the output power Po or not. Moreover, the third range Ric can be customized to be set by the user through the second customizing unit 70 according to the requirement. The third range Ric has to meet within a range of a factory setting of the power distribution apparatus 100. If the user does not set the third range Ric in the second customizing unit 70, the third range Ric is the range of the factory setting. If the user sets the third range Ric, the third range Ric relies mainly on the user's setting, but the third range Ric still has to meet within the range of the factory setting. Moreover, the calculation unit 42 is not limited to only detect the power source information Ii to work out the input information Iic mentioned above. The management unit 60 is not limited to only determine whether the input information Iic mentioned above meets within the third range Ric or not. For example but not limited to, the calculation unit 42 can further detect the variation range of the voltage or current of the input power Pin in a predetermined time to inform the management unit 60 of the variation range mentioned above. For example, the third range Ric can be set that the variation range of the voltage of the input power Pin sent through the power source terminal 10 in the predetermined time has to be less than 30 volts, or the variation range of the current has to be less than 5 amperes. And then the third range Ric mentioned above is provided to the management unit 60 to determine.

As shown in FIG. 1, the power distribution apparatus 100 further comprises a transmission unit 80 electrically connected to the management unit 60. The management unit 60 transmits the information in the management unit 60 to an external interface (not shown in FIG. 1) through the transmission unit 80. The external interface can remotely control the management unit 60 through the transmission unit 80. The transmission unit 80 communicates with the external interface through the serial communication or the Internet with the wire or wireless method. The external interface can be the human-machine interface, computer or hand-held device. Moreover, the transmission method can be the uni-directional data transmission that the user only knows the status of the power distribution apparatus 100 but cannot control the power distribution apparatus 100. Or the transmission method can be the interactive data transmission that after the user knows the status of the power distribution apparatus 100, the user remotely controls the power distribution apparatus 100.

As shown in FIG. 1, the power distribution apparatus 100 further comprises at least a circuit-breaking unit 90. Each of the circuit-breaking units 90 is electrically connected between the power-distributing module 20 and the power distribution module 30. The power distribution apparatus 100 turns off the circuit-breaking units 90 to control the output ports 31 to stop outputting the output power Po. Taking FIG. 1 as an example, the power distribution apparatus 100 comprises two power distribution modules 30. Each of the paths between the power-distributing module 20 and the power distribution module 30 has a circuit-breaking unit 90, so that there are two circuit-breaking units 90 as shown in FIG. 1. The on-off status of the circuit-breaking unit 90 can be transmitted to the external interface through the transmission unit 80. The circuit-breaking unit 90 can be a one-time breaking device, for examples a fuse or a manual switch. Or the circuit-breaking unit 90 can be a controllable breaking device, for examples a relay or a transistor switch, so the management unit 60 or the external interface controls the on-off status of the circuit-breaking unit 90 (namely, turns on or off the circuit-breaking unit 90).

Figure 2:
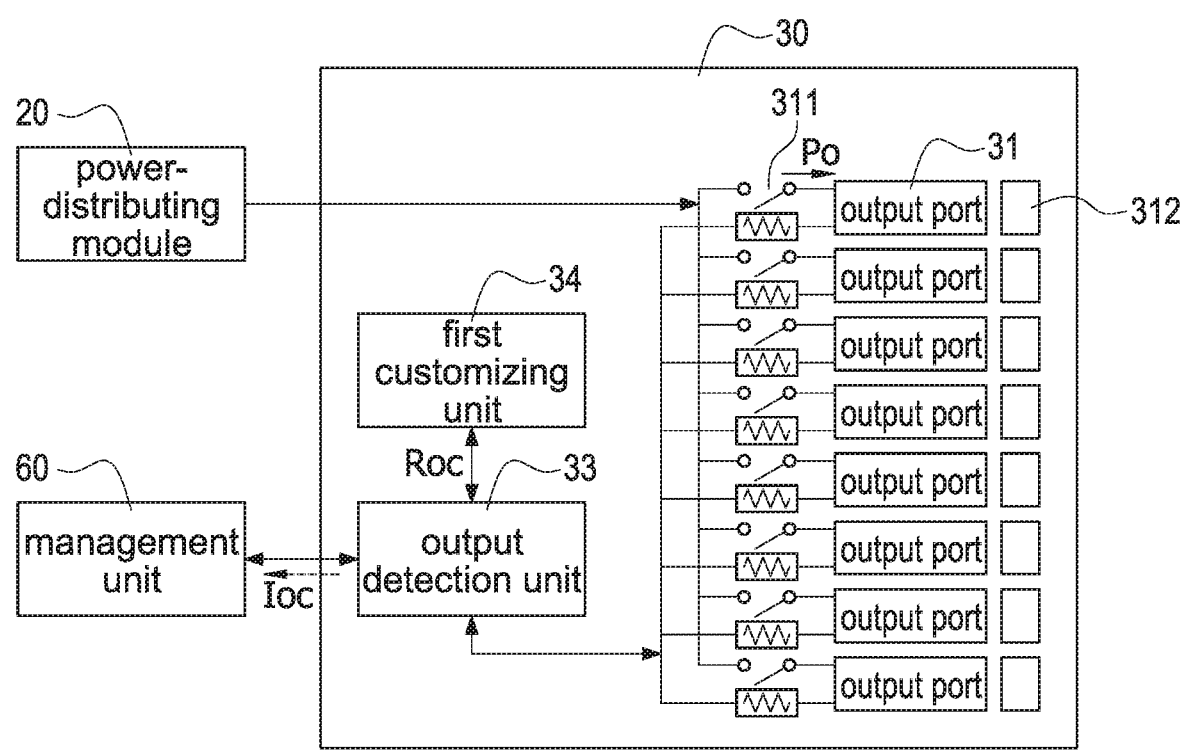
FIG. 2 shows a block diagram of the power distribution module of the present invention.

FIG. 2 shows a block diagram of the power distribution module of the present invention. Please refer to FIG. 1 again. Each of the power distribution modules 30 further comprises an output detection unit 33 electrically connected between the management unit 60 and the output ports 31. The output detection unit 33 detects the output power Po of each of the output ports 31 to convert the output power Po of each of the output ports 31 into the output information Ioc correspondingly. The output detection unit 33 outputs the output information Ioc to the management unit 60. The output detection unit 33 is electrically connected to each of the output ports 31 to detect (namely, work out) the signals for each of the output ports 31 to obtain the voltage information, current information, apparent power information, effective power (namely, active power) information and frequency information of the output power Po of each of the output ports 31. According to the detected information mentioned above, the output detection unit 33 works out a set of power factor information and total harmonic distortion information of the output power Po of each of the output ports 31, and then the output information Ioc which is worked out is outputted from the output detection unit 33 to the management unit 60. Therefore, the output information Ioc comprises the voltage information, the current information, the apparent power information, the effective power (namely, active power) information, the frequency information, the power factor information and the total harmonic distortion information of the output power Po of each of the output ports 31. Taking FIG. 2 as an example, the power distribution module 30 comprises eight output ports 31, so that the output detection unit 33 detects the output power Po of each of the eight output ports 31 correspondingly, and converts eight output powers Po of the eight output ports 31 into one set of the output information Ioc correspondingly, so the output information Ioc comprises the information of the output powers Po of the eight output ports 31. Moreover, in this embodiment, the transmission of the output information Ioc between the management unit 60 and the output detection unit 33 is the controller area network (CAN) bus transmission, and an optical coupling unit (or an isolator) is used to isolate the dangerous signals (for examples, the signal is abnormal or the voltage is over the threshold value), but the present invention is not limited to it. In another word, the output information Ioc can be transmitted through the physical connection wires or wireless transmission, and in this embodiment, the isolation from the dangerous signals can be achieved by the transformer or the switches and so on.

Please refer to FIG. 1 again. As shown in FIG. 2, each of the power distribution modules 30 further comprises a first customizing unit 34 electrically connected to the output detection unit 33. The first customizing unit 34 can store a second range Roc of the output power Po outputted from each of the output ports 31. The second range Roc is outputted to the management unit 60 through the output detection unit 33. The management unit 60 compares the second range Roc with the output information Ioc to determine whether the output ports 31 output the output power Po or not. Moreover, the second range Roc can be customized to be set by the user through the first customizing unit 34 according to the requirement. The second range Roc has to meet within the range of the factory setting of the power distribution apparatus 100. If the user does not set the second range Roc in the first customizing unit 34, the second range Roc is the range of the factory setting. If the user sets the second ranges Roc, the second ranges Roc rely mainly on the user's setting, but the second ranges Roc still have to meet within the range of the factory setting. Moreover, the output detection unit 33 is not limited to only detect to work out the output information Ioc mentioned above. The management unit 60 is not limited to only determine whether the output information Ioc mentioned above meets within the second ranges Roc or not. For example but not limited to, the output detection unit 33 can further detect the variation range of the voltage or current of the output power Po in a predetermined time to inform the management unit 60 of the variation range mentioned above. For example, the second range Roc can be set that the variation range of the voltage of the output power Po of the output ports 31 in the predetermined time has to be less than 30 volts, or the variation range of the current has to be less than 5 amperes. And then the second range Roc mentioned above is provided to the management unit 60 to determine. Moreover, in this embodiment, the output detection unit 33 is to detect the output power Po of each of the output ports 31 to convert the output power Po of each of the output ports 31 into the output information Ioc. The first customizing unit 34 provides the second range Roc. Therefore, in this embodiment, the output detection unit 33 and the first customizing unit 34 can independently work from the power distribution module 30. The output detection unit 33 is connected between the first customizing unit 34, the management unit 60 and the power distribution modules 30, and converts the output power Po of each of the output ports 31 into the output information Ioc, and provides the second range Roc through the first customizing unit 34.

As shown in FIG. 2, each of the output ports 31 comprises a switch unit 311. The management unit 60 turns off the switch unit 311, so that the output port 31 stops outputting the output power Po. Taking FIG. 2 as an example, the power distribution module 30 comprises eight output ports 31, and each of the output ports 31 comprises a switch unit 311, but the present invention is not limited to it. In another word, a quantity of the switch unit 311 is determined by a quantity of the output port 31. After the management unit 60 determines or sets through the external interface, on-off information of the switch unit 311 is sent to the output detection unit 33. According to the on-off information received by the output detection unit 33, the switch unit 311 is turned on or off correspondingly, so that the output ports 31 turns on or off the output power Po.

Please refer to FIG. 1 again. As shown in FIG. 2, each of the output ports 31 comprises a display unit 312. The display unit 312 displays that whether the output port 31 outputs the output power Po or not. When the output detection unit 33 receives the on-off information of the output ports 31 (the switch units 311) sent by the management unit 60 and the switch unit 311 is turned on or off correspondingly, the display unit 312 displays whether the switch unit 311 is turned on or off. Taking FIG. 2 as an example, if the top-down first~fourth display unit 312 are in the lighting status, the top-down first~fourth output port 31 outputting the output power Po can be visually observed directly. Moreover, the display unit 312 of the present invention is, for example to not limited to, a light emitting diode. Therefore, the display unit 312 of the present invention can be any display such that the output port 31 outputting the output power Po can be visually observed directly.

As shown in FIG. 1 and FIG. 2, the management unit 60 receives the electrical leakage information Ilc. The electrical leakage information Ilc comprises the ground impedance value and the leakage current value. The management unit 60 determines whether the electrical leakage information Ilc is exceeding (or out of, not within) a first range Rt or not to determine whether the ground connection of the power source terminal 10 and the ground connection of the external power source circuit are complete or not. Generally speaking, if the ground impedance value and the leakage current value are less, the ground connection status of the device and the external power source circuit is better. Because the signal measurement has some errors easily, in order to avoid the power distribution apparatus 100 being sensitive to generate the false operation, the first range Rt is the best that the ground impedance is less than 10Ω (ohms) or the leakage current is less than 3 mA. Therefore, in this embodiment, if the ground impedance of the electrical leakage information Ilc is greater than 10Ω or the leakage current is greater than 3 mA, it means that the ground connection of the power source terminal 10 and the ground connection of the external power source circuit are not complete. At this time, the management unit 60 controls the output detection units 33 to turn off the switch units 311 to control the output ports 31 to stop outputting the output power Po. Moreover, the electrical leakage detection unit 50 is not limited to detect to output the electrical leakage information Ilc mentioned above of the input power Pin to the management unit 60 to determine. Therefore, the electrical leakage information Ilc which can be determined whether the ground connection of the power source terminal 10 and the ground connection of the external power source circuit are complete or not should be included in the present invention. For example but not limited to, the electrical leakage detection unit 50 can further detect and output signals of the insulation impedance information of the input power Pin to the management unit 60. The management unit 60 determines the insulation impedance information of the input power Pin to determine whether the output ports 31 should be controlled to turn off the output power Po or not.

Please refer to FIG. 1 and FIG. 2 again. The management unit 60 receives at least a set of output information Ioc and the input information Iic, and compares the voltage value of the output information Ioc and the voltage value of the input information Iic to determine whether the output ports 31 should be controlled to turn off the output power Po or not. When a voltage difference ΔV of the output power Po of one of the output ports 31 and the input power Pin of the power source terminal 10 is greater than a voltage error value Vd, the management unit 60 controls the output ports 31 to stop outputting the output power Po. Generally speaking, in the normal operation of the power distribution apparatus 100, the input power Pin of the power source terminal 10 should be the same with the output power Po of the output ports 31. Because the internal circuit of the power distribution apparatus 100 is damaged, or because the connection of the internal circuits is not good, or because the external connection is not good, the voltage difference ΔV between the input power Pin of the power source terminal 10 and the output power Po of the output ports 31 is generated. And because the signal measurement has some errors easily, in order to avoid the power distribution apparatus 100 being sensitive to generate the false operation, when the power distribution apparatus 100 is no-load, the voltage error value Vd (or the voltage difference ΔV) between the input power Pin of the power source terminal 10 and the output power Po of the output ports 31 within 10 volts is the best. Therefore, in this embodiment, if the voltage difference ΔV is greater than 10 volts, it means that the power distribution apparatus 100 is influenced by the damage of the internal circuits, the bad connection of the internal circuits or the bad external connection. At this time, the management unit 60 controls the output detection units 33 to turn off the switch units 311 to control the output ports 31 to stop outputting the output power Po.

As shown in FIG. 1 and FIG. 2, the management unit 60 receives the input information Iic to determine whether the input information Iic is within the third range Ric set by the second customizing unit 70 or not. The second customizing unit 70 is used to set the phase voltage upper-lower bound, the phase current upper-lower bound, the frequency upper-lower bound, the power factor threshold and the total harmonic distortion threshold which are acceptable by the power distribution module 30 as the third range Ric, and outputs the third range Ric to the management unit 60 to determine. When the input information Iic is not within the third range Ric for a specific power distribution module 30, the management unit 60 will turn off all of the output ports 31 of the specific power distribution module 30 correspondingly. Taking FIG. 1 as an example, if the power factor threshold of one of the power distribution modules 30 is set as 0.7 while the power factor threshold of another power distribution module 30 is set as 0.8 due to different load requirement, when the input detection unit 40 detects that the power factor of the input power Pin is 0.75, the management unit 60 will control the eight output ports 31 of the power distribution modules 30 with the power factor threshold being set as 0.8 to be turned off. Moreover, in this embodiment, the management unit 60 is not limited to turn off all of the output ports 31 of the power distribution module 30. The management unit 60 can turn off the circuit-breaking unit 90 or the switch units 311 through the output detection unit 33 to achieve the efficiency of turning off the output power Po through the output ports 31.

Please refer to FIG. 1 and FIG. 2 again. The management unit 60 receives at least a set of output information Ioc outputted by at least one power distribution module 30 and determines whether the output information Ioc is within the second range Roc set by the first customizing unit 34 or not. The first customizing unit 34 can set the current upper limit, the power factor threshold and the total harmonic distortion threshold of the output power Po of each of the output ports 31. When the output information Ioc is not within the second range Roc, the management unit 60 turns off the output ports 31 which are not within the second range Roc correspondingly. Taking FIG. 1 as an example, if the total harmonic distortion threshold of four of the output ports 31 of one of the power distribution modules 30 is set to be less than 10% while the total harmonic distortion threshold of the other four of the output ports 31 of the power distribution modules 30 is set to be less than 5%, when the output detection unit 33 of the power distribution modules 30 detects that the total harmonic distortion threshold of the output power Po is 8%, the management unit 60 controls to turn off the four output ports 31 with the total harmonic distortion threshold being set to be less than 5%.

As shown in FIG. 1 and FIG. 2, the user can control all of the output ports 31 to output the output power Po or some of the output ports 31 to output the output power Po by the external interface or the management unit 60. Taking FIG. 1 as an example, the management unit 60 can control odd output ports 31 of one of the power distribution modules 30 to output the output power Po, and can control even output ports 31 of the other power distribution modules 30 to output the output power Po, and lightens the display units 312 which are at the side of the output ports 31 outputting the output power Po. Moreover, the display unit 312 can display that the status of the output port 31 is outputting the output power Po, the output power Po is turned off by the user actively or the management unit 60 detects that the information is not within the third range Ric or the second range Roc thus to stop outputting the output power Po. For example but not limited, when the output port 31 outputs the output power Po, the display unit 312 displays green. When the output port 31 is turned off to turn off the output power Po by the user actively, the display unit 312 displays yellow. When the management unit 60 detects that the information is not within the third range Ric or the second range Roc so the output port 31 stops outputting the output power Po, the display unit 312 displays red. Therefore, the efficiency of visually judging the statuses of the output ports 31 is achieved easily.

Moreover, the management unit 60 is not limited to only determine whether the information mentioned above is within the third range Ric (or the second range Roc) or not. For example but not limited to, the management unit 60 can record when the voltage, current, frequency, power factor and total harmonic distortion of the input power Pin is better (or worse) in one day or time, so that the user can arrange the load which requires better power source quality to be connected to the output port 31 (namely, to be turned on to receive the input power Pin) when the input power Pin is better, or the user can actively turn off the load which requires better power source quality when the input power Pin is worse. For example but not limited to, the management unit 60 can transmit the information of the input power Pin, the information of the output power Po, the on-off status of each of the output ports 31 and the third range Ric to the external interface.

Figure 3:
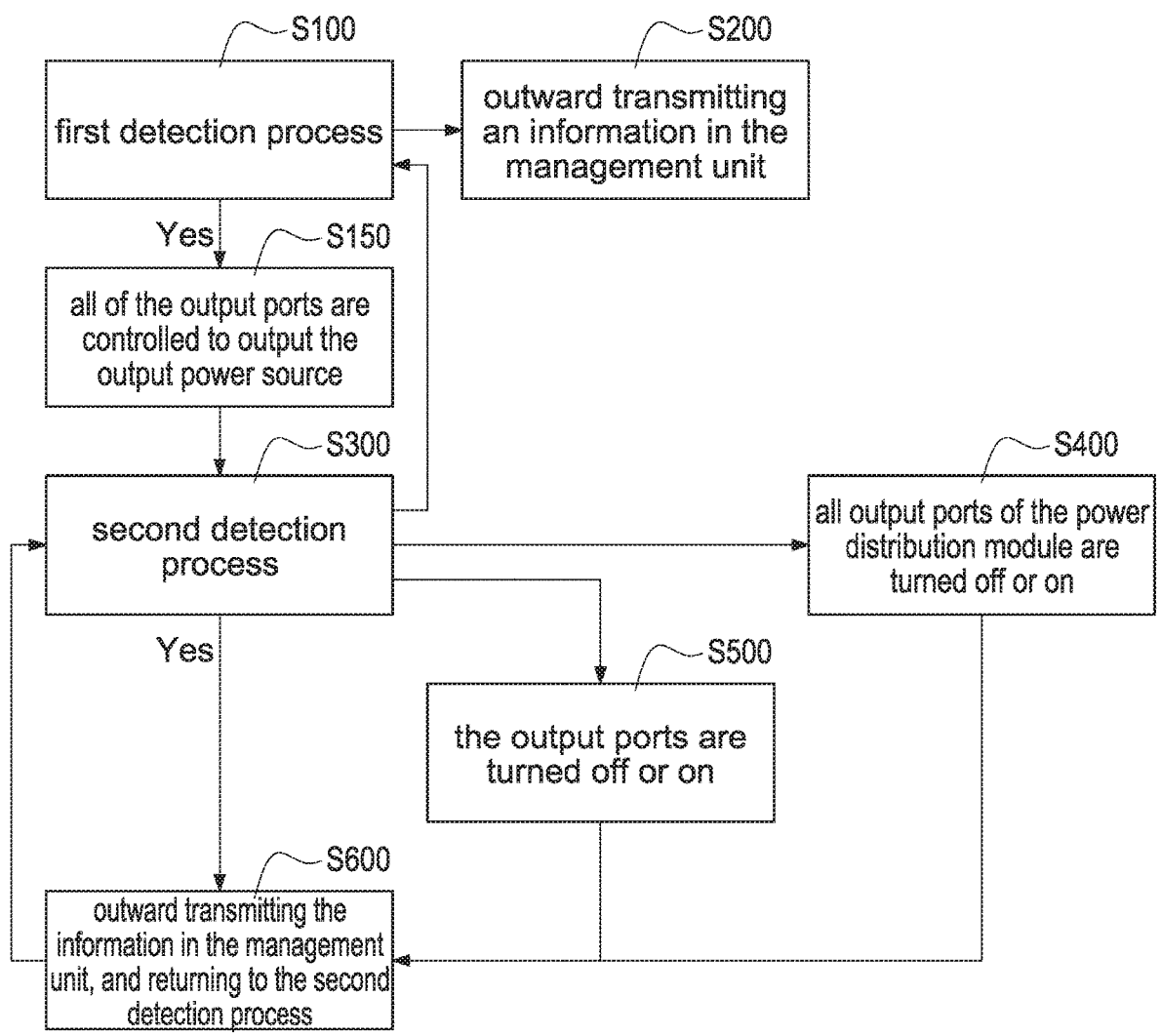
FIG. 3 shows a flow chart of the detection for the power distribution apparatus of the present invention.

FIG. 3 shows a flow chart of the detection for the power distribution apparatus of the present invention. Please refer to FIG. 1 and FIG. 2 again. The power distribution apparatus 100 is electrically connected to an external power source circuit (not shown in FIG. 3) and distributes an input power Pin to a plurality of output ports 31 of at least a power distribution module 30. A management unit 60 controls the output ports 31 to output or the management unit turns off the output power Pin. The operation method comprises following steps. First, the management unit 60 performs a first detection process (S100) and then determines whether the output ports 31 are turned on or off when the power distribution apparatus 100 receives the input power Pin from the external power source circuit. The management unit 60 controls the switch units 311 to be turned off to turn off the output ports 31 through the output detection units 33 so that the output ports 31 outputs or stops outputting the output power Po. Then, after the management unit 60 performs the first detection process (S100), if the output ports 31 are turned off, the management unit 60 outward transmits a set of information in the management unit 60 (S200), and waits for the troubleshooting to return to the first detection process (S100). The management unit 60 outward transmits the information in the management unit 60 to the external interface through the serial communication or the Internet. The information in the management unit 60 comprises, for example but not limited to, the information of the input power Pin, the information of the output power Po, the on-off statuses of the output ports 31, the input information Iic, the electrical leakage information 11c, at least a set of output information Ioc, the first range Rt, the second range Roc, the third range Ric and other information in the management unit 60. The user can set the second range Roc and the third range Ric through the external interface or the management unit 60, and the on-off statuses of the output ports 31 can be customized. Then, after the management unit 60 performs the first detection process (S100), if all the output ports 31 output the output power Po, the management unit 60 performs a second detection process (S300), and then determines whether the output ports 31 are turned on or off. When the power distribution apparatus 100 receives the input power Pin from the external power source circuit, the management unit 60 has to perform the first detection process (S100) once to provide the power distribution apparatus 100 and the back-end load with the basic protection. Finally, after the management unit 60 performs the second detection process (S300), the management unit 60 outward transmits the information in the management unit 60 (S400~S600) and returns to the second detection process (S300). After the management unit 60 performs the first detection process (S100), when all the output ports 31 output the output power Po, the management unit 60 continues to perform the second detection process (S300). At this time, if the management unit 60 determines that at least one output port 31 has to be turned off to stop outputting the output power Po, management unit 60 controls the switch units 311 through the output detection units 33 to turn off the output port 31. Until (namely, when) the management unit 60 determines that the output port 31 can be turned on again to supply the output power Po, the management unit 60 just controls the switch units 311 through the output detection units 33 to turn on the output port 31.

Figure 4:
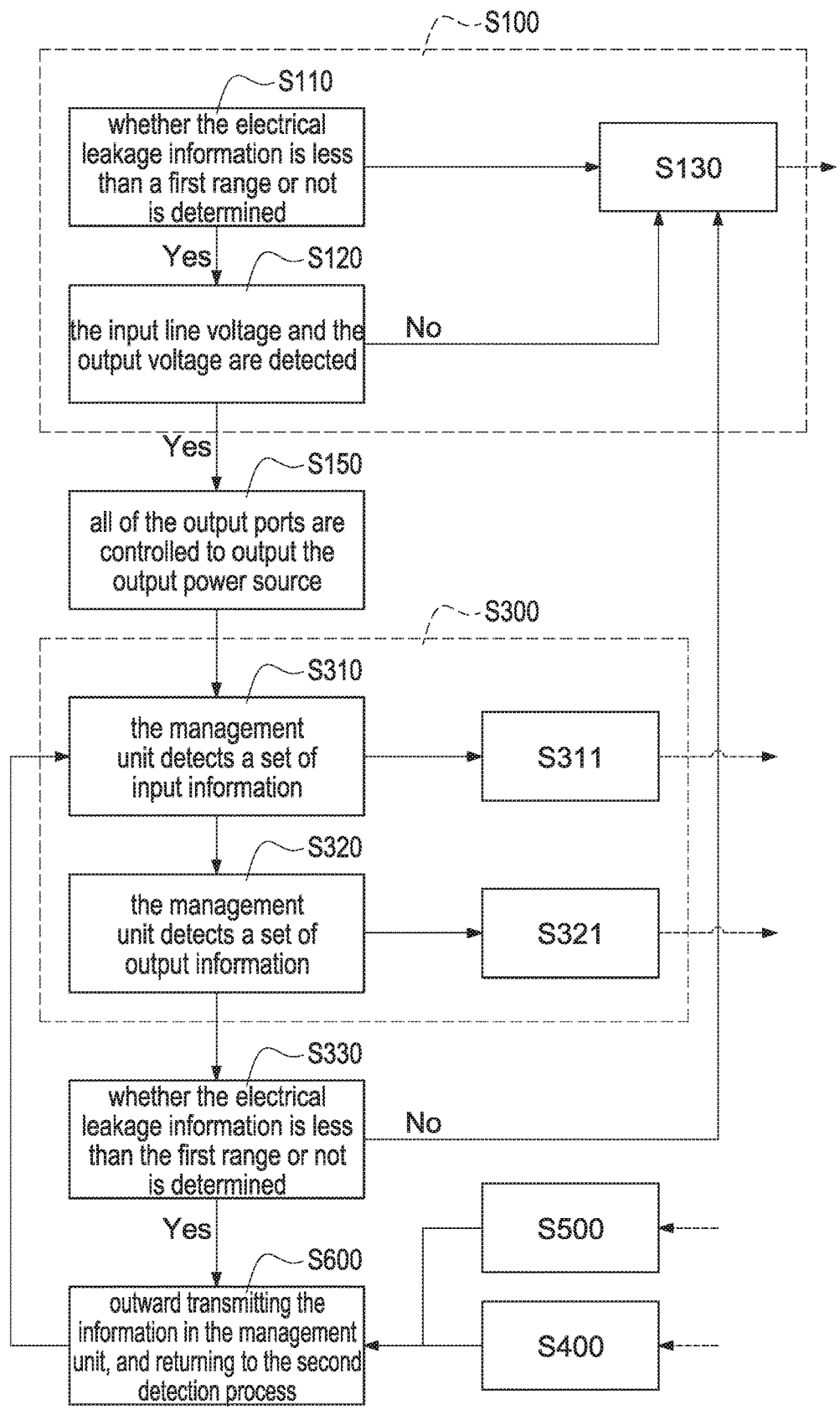
FIG. 4 shows a flow chart of the normal operation of the power distribution apparatus of the present invention.

FIG. 4 shows a flow chart of the normal operation of the power distribution apparatus of the present invention. Please refer to FIGS. 1~3. The normal operation process comprises following steps. First, whether the electrical leakage information is less than a first range or not is determined (S110). When the management unit 60 determines that the electrical leakage information Ilc is within a first range Rt, it means that the ground impedance of the electrical leakage information Ilc is less than 10Ω (ohms) and the leakage current is less than 3 mA. Then, the input line voltage and the output voltage are detected (S120). The management unit 60 detects whether the input line voltage between the power source terminal 10 and the power-distributing module 20 is normal or not, and detects whether the output voltage between the power-distributing module 20 and the output ports 31 is normal or not. When the input line voltage and the output voltage are both normal, the first detection process (S100) is finished. Moreover, one of the (normal) statuses that the management unit 60 determines the input line voltage and the output voltage is that when the management unit 60 determines that the voltage difference ΔV between the input power Pin and the output power Po is less than a voltage error value Vd, that means that the connection of the internal circuits of the power distribution apparatus 100 is complete and can work normally, wherein the input power Pin is between the power source terminal 10 and the power-distributing module 20 while the output power Po is between the power-distributing module 20 and one of the output ports 31. But the present invention is not limited to it. The present invention comprises any embodiments that can determine whether the circuits of the power distribution apparatus 100 are normal or not. Then, all of the output ports are controlled to output the output power (S150). After the first detection process (S100) is performed, the management unit 60 controls all of the output ports 31 to output the output power Po. Moreover, the output ports 31 are controlled by the external interface or the management unit 60 to output the output power Po, or the output ports 31 are controlled by the external interface or the management unit 60 to be controlled selectively to output the output power Po (namely, some output ports 31 is selected to output the output power Po), so that the power distribution apparatus 100 and the load connected to the power distribution apparatus 100 are managed effectively and flexibly.

After the detection process mentioned above is performed and the power distribution apparatus 100 is determined as working normally, the process goes to the second detection process (S300). Then, the management unit detects a set of input information (S310). The input information Iic comprises the voltage (phase voltage) information, the current (phase current) information, the apparent power information, the effective power (namely, active power) information, the virtual power (namely, reactive power) information, the frequency information, the phase information, the phase difference information, the power factor information and the total harmonic distortion information of the input power Pin of the power source terminal 10. Then, the management unit detects a set of output information (S320). The output information Ioc comprises the voltage information, the current information, the apparent power information, the effective power (namely, active power) information, the frequency information, the power factor information and the total harmonic distortion information of the output power Po of the output ports 31. Then, whether the electrical leakage information is within the first range or not is determined (S330). In the second detection process (S300), the management unit 60 continues to detect whether the electrical leakage information Ilc is within the first range Rt or not, to ensure that the ground connection of the power distribution apparatus 100 is complete. Finally, the information in the management unit is outward transmitted and the process returns to the second detection process (S600). When the management unit 60 has performed the steps (S110~S330) mentioned above, the management unit 60 transmits the information in the management unit 60 to the external interface and returns to the second detection process (S300), so that the user is aware that the electricity consumption status of the power distribution apparatus 100 and the back-end load.

Figure 5:
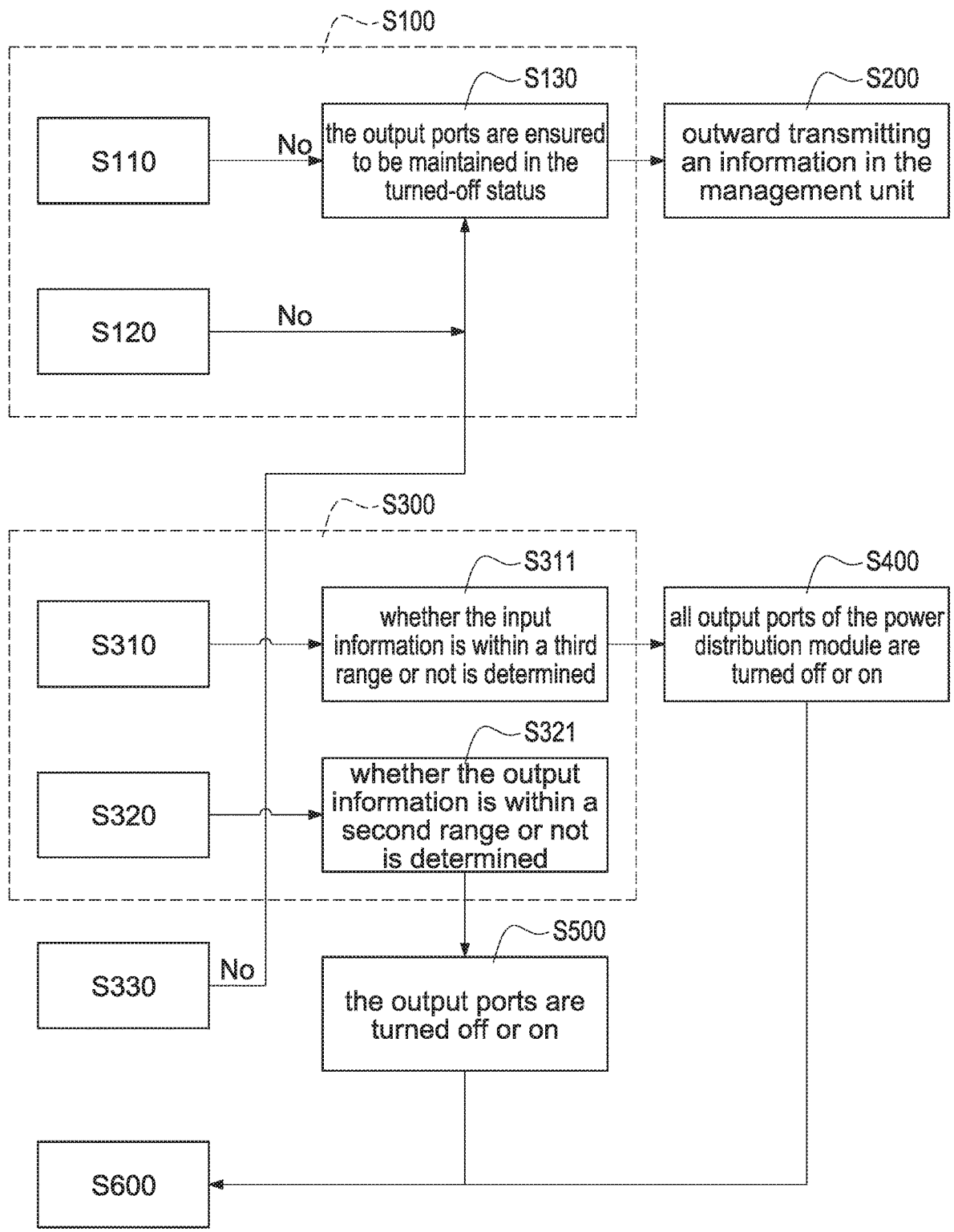
FIG. 5 shows a flow chart of the abnormity protection of the power distribution apparatus of the present invention.

FIG. 5 shows a flow chart of the abnormity protection of the power distribution apparatus of the present invention. Please refer to FIGS. 1~4 as well. The abnormity protection process comprises following steps. First, the output ports are ensured to be maintained in the turned-off status (S130). When the steps (S110) or (330) determines that the electrical leakage information Ilc is exceeding the first range Rt, or when the step (S120) determines that the internal circuit is abnormal, the management unit 60 controls the output ports 31 to be turned off to stop outputting the output power Po. When the management unit 60 determines that the ground impedance of the electrical leakage information Ilc is greater than 10Ω or the leakage current is greater than 3 mA, it means that the ground connection of the power source terminal 10 and the ground connection of the external power source circuit are not complete. At this time, the management unit 60 controls the output detection units 33 to turn off the switch units 311, or controls to turn off the circuit-breaking units 90, to control all of the output ports 31 to be turned off to stop outputting the output power Po. In the step (S120), when the management unit 60 determines that the voltage difference ΔV between the input power Pin and the output power Po is greater than the voltage error value Vd, the management unit 60 controls the output ports 31 to turn off the output power Po, wherein the input power Pin is between the power source terminal 10 and the power-distributing module 20 while the output power Po is between the power-distributing module 20 and one of the output ports 31. When the voltage error value Vd (or the voltage difference ΔV) is greater than 10 volts, it means that the power distribution apparatus 100 is influenced by the damage of the internal circuits, the bad connection of the internal circuits or the bad external connection. At this time, the management unit 60 controls the output detection units 33 to turn off the switch units 311, or controls to turn off the circuit-breaking units 90, to control the output ports 31 to be turned off to stop outputting the output power Po. Then, the information in the management unit is outward transmitted (S200), and waits for the troubleshooting to return to the first detection process (S100).

When the management unit 60 performs the first detection process (S100) and when the output ports 31 are turned off and stops outputting the output power Po, that means that the ground connection of the power source terminal 10 and the ground connection of the external power source circuit are not connected completely, or the power distribution apparatus 100 is influenced by the damage of the internal circuits, the bad connection of the internal circuits or the bad external connection. In such situation, if the input power Pin is transmitted, the power distribution apparatus 100 or the back-end load are damaged easily. Therefore, the management unit 60 continues to detect that the output ports 31 have to be maintained in the turned-off status to protect the power distribution apparatus 100 or the back-end load.

Please refer to FIG. 5 again. Please refer to FIGS. 1–4 as well. In the second detection process (S300), the process continues to determine whether the input power Pin received by the power distribution apparatus 100 is normal or not. Then, whether the input information is within a third range or not is determined (S311). The management unit 60 determines whether the input information Iic is within the third range Ric or not, and it is a basis to determine whether the output ports 31 shall be turned on or off. Finally, all output ports of the power distribution module are turned off or on (S400). When the input information Iic is not within the third range Ric for a specific power distribution module 30, the management unit 60 will turn off all of the output ports 31 of the specific power distribution module 30 correspondingly. For example but not limited to, the third range Ric comprises that the frequency is between 47 Hz to 63 Hz, the voltage is between 180 VAC to 264 VAC, the power factor is greater than 0.7 and the total harmonic distortion is less than 10% and the duration is less than 36 hours. When the management unit 60 determines whether the input information Iic is within the third range Ric or not, and when the input information Iic is within the third range Ric of the power distribution module 30, the management unit 60 correspondingly controls all of the output ports 31 of the power distribution module 30 within the third range Ric to be turned on to output the output power Po. When the input information Iic is not within the third range Ric of the power distribution module 30, the management unit 60 correspondingly turns off all of the output ports 31 of the power distribution module 30 which is not within the third range Ric. Until (namely, when) the management unit 60 determines that the input information Iic mentioned above which is not within the third range Ric is within the third range Ric again, all of the output ports 31 of the power distribution module 30 within the third range Ric are turned on.

Please refer to FIG. 5 again. Please refer to FIGS. 1-4 as well. In the second detection process (S300), the process continues to determine whether the output power Po of the power distribution apparatus 100 is normal or not. Then, whether at least a set of output information is within a second range or not is determined (S321). The management unit 60 determines whether the output information Ioc is within the second range Roc or not, and it is a basis to determine whether the output ports 31 shall be turned on or off. Finally, the output ports are turned off or on (S500). When the output information Ioc is not within the second range Roc, the management unit 60 correspondingly turns off the output ports 31 which is not within the second range Roc. For example but not limited to, the second range Roc comprises that the frequency is between 47 Hz to 63 Hz, the power factor is greater than 0.7 and the total harmonic distortion is less than 30%. The management unit 60 determines whether all the output information Ioc is within the second range Roc or not. When the output information Ioc is within the second range Roc, the management unit 60 correspondingly controls the output port 31 within the second range Roc to be turned on to output the output power Po. When the output information Ioc is not within the second range Roc, the management unit 60 correspondingly turns off the output port 31 which is not within the second range Roc. Until (namely, when) the management unit 60 determines that the output information Ioc mentioned above which is not within the second range Roc is within the second range Roc again, the output ports 31 within the second range Roc are turned on.

In conclusion, the present invention comprises following advantages.

1. The power distribution apparatus 100 can detect the input power Pin and the output power Po. When the power distribution apparatus 100 detects that the input power Pin or the output power Po is abnormal, the management unit 60 and the external interface are informed that the input power Pin or the output power Po is abnormal, so that the efficiency of stabilizing the quality of the input power Pin and the output power Po is achieved.

2. The power distribution apparatus 100 can detect the leakage current. When the ground wire of the power distribution apparatus 100 is not connected to ground certainly, or even when the power distribution apparatus 100 is not connected to the ground wire (namely, the power distribution apparatus 100 does not have the ground wire), the management unit 60 and the external interface are informed of such situation mentioned above to achieve the efficiency of avoiding dangerous human body feeling electricity.

3. The power distribution apparatus 100 has the detection before power transmitting and the continuous detection in operation. A complete detection process is designed for the power distribution apparatus 100 to provide the complete protection mechanism.

4. The power distribution apparatus 100 has protection parameters which are customized and adjustable. The user can set the protection parameters for each of the power distribution modules 30 to achieve the efficiency of flexibly adjusting the arrangement of the back-end loads.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power distribution apparatus comprising:
a power source terminal receiving an input power;
a power-distributing module electrically connected to the power source terminal and receiving the input power and outputting an output power;
a plurality of power distribution modules, each of the power distribution modules comprising a plurality of output ports and electrically connected to the power-distributing module to receive the output power to output the output power through the output ports;
an input detection unit electrically connected between the power-distributing module and the power source terminal to detect the input power to generate an input information;
at least one output detection unit electrically connected to the output ports and detecting the output power to generate at least one output information correspondingly; and
a management unit, according to the input information and the at least one output information, the management unit controlling the output ports to be turned on or off correspondingly,
wherein
the management unit sets a separate input range for each power distribution module, and sets a separate output range for each output port,
when the input information is not within the input range for a specific power distribution module of the plurality of power distribution module, the management unit turns off all of the output ports of the specific power distribution module correspondingly, and when a specific output information of the at least one output information is not within the output range for a correspondingly specific output port of the plurality of output ports, the management unit turns off the correspondingly specific output port correspondingly.

2. The power distribution apparatus in claim 1 further comprising:

an electrical leakage detection unit electrically connected to the power source terminal and outputting electrical leakage information to the management unit, wherein the management unit controls the output ports to be turned off according to the electrical leakage information exceeding a first range.

3. The power distribution apparatus in claim 1, wherein each power distribution module further comprises a first customizing unit electrically connected to the at least one output detection unit; the first customizing unit generates the output ranges.

4. The power distribution apparatus in claim 1, wherein the power distribution apparatus further comprises a second customizing unit electrically connected to the management unit; the second customizing unit generates the input ranges.

5. The power distribution apparatus in claim 4, wherein the management unit at least determines whether a power factor and a total harmonic distortion information of the input information are within the input ranges or not.

6. The power distribution apparatus in claim 1, wherein the input detection unit comprises:

a detection unit electrically connected between the power-distributing module and the power source terminal to detect the input power and output a power source information; and a calculation unit electrically connected to the detection unit and converting the power source information into the input information.

7. The power distribution apparatus in claim 1 further comprising:

a transmission unit electrically connected to the management unit, the transmission unit outward transmitting information in the management unit.

* * * * *